C. E. AKELEY.
TRIPOD.
APPLICATION FILED APR. 22, 1916.
1,244,682.
Patented Oct. 30, 1917.
3 SHEETS—SHEET 2.
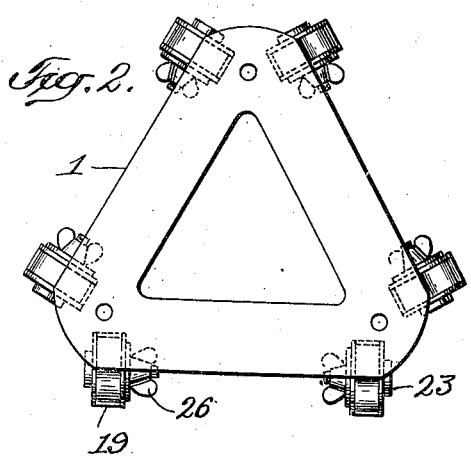
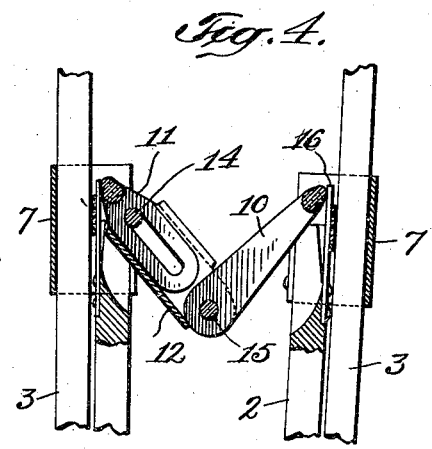
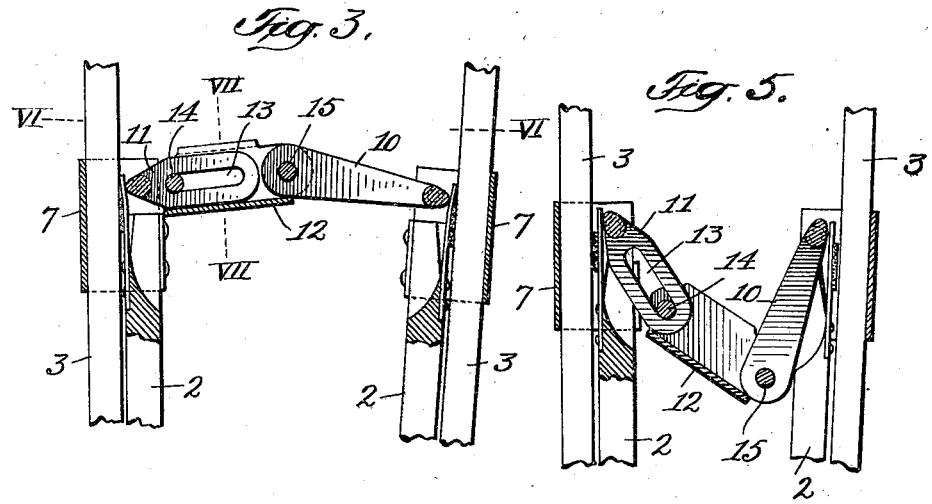
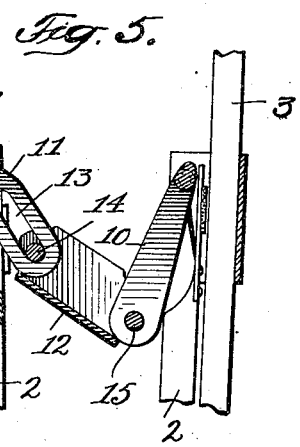
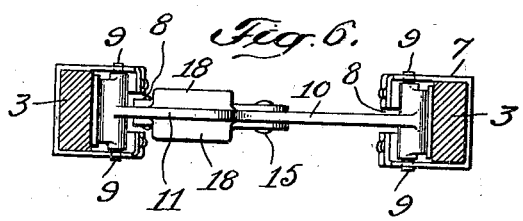
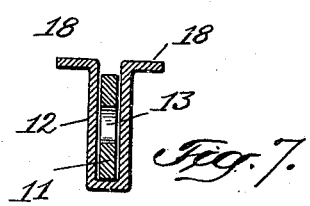
WITNESS:
INVENTOR
Carl E. Akeley
by Percy B. Hills
ATTORNEY

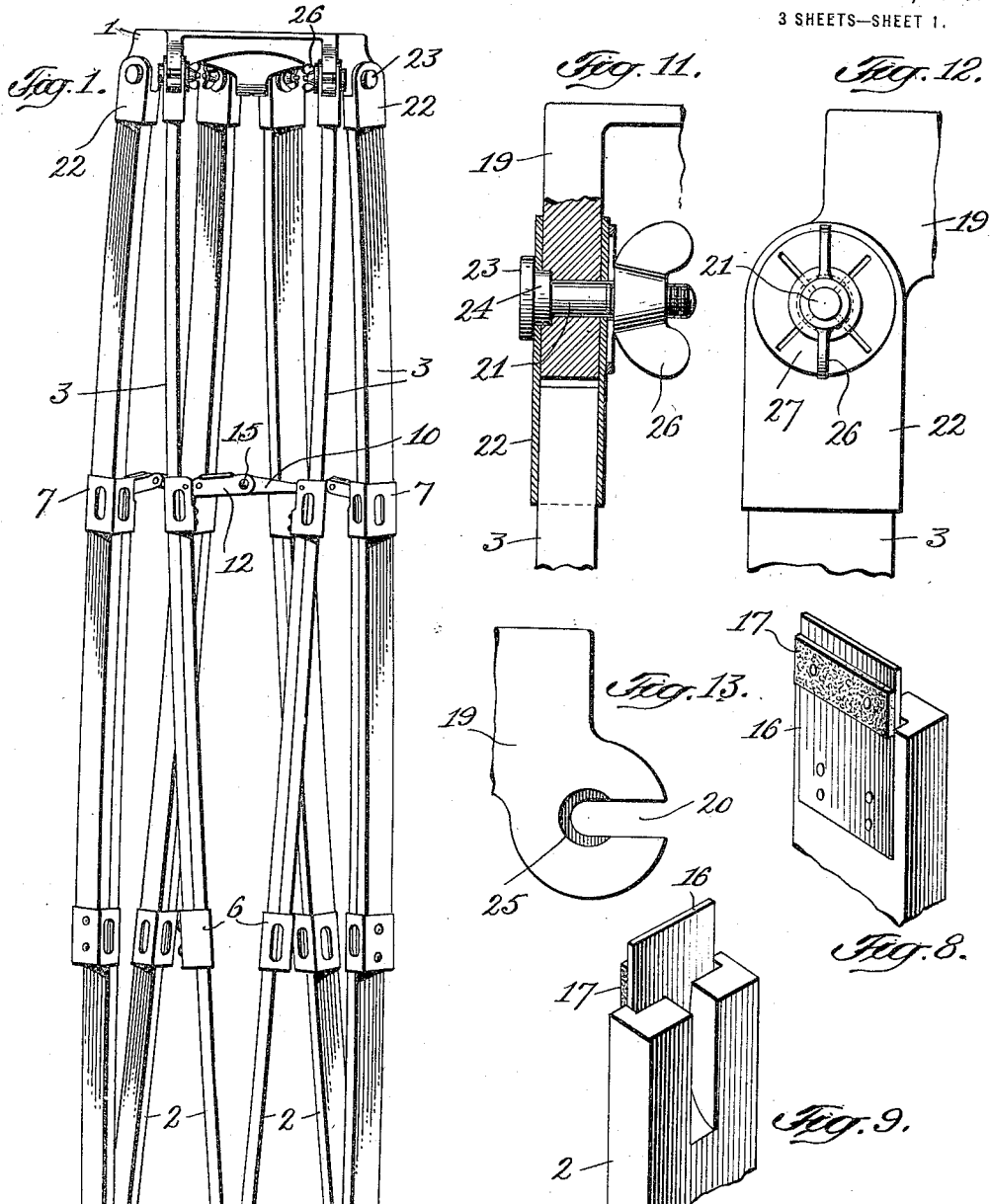

UNITED STATES PATENT OFFICE.

CARL E. AKELEY, OF NEW YORK, N. Y., ASSIGNOR TO AKELEY CAMERA, INC., OF NEW YORK, N. Y., A CORPORATION OF NEW YORK.

TRIPOD.

1,244,682.  Specification of Letters Patent.  Patented Oct. 30, 1917.

Application filed April 22, 1916. Serial No. 92,974.

*To all whom it may concern:*

Be it known that I, CARL E. AKELEY, a citizen of the United States, residing at New York, in the borough of Manhattan, city of New York, and State of New York, have invented certain new and useful Improvements in Tripods, for which the following is a specification.

My invention relates to tripods, more particularly designed for use in connection with motion picture cameras and projectors, and has for its object to provide certain improvements in the construction of the same as follows:—

First, to provide an improved means for locking the telescoping sections of the tripod legs in any adjusted position, and for instantly unlocking the same in order to permit a quick adjustment.

Secondly, to provide means whereby the tripod legs, each of which is formed of two members connected at the bottom, may be braced intermediate their length to provide a truss effect, whereby extreme rigidity of the same is attained.

Thirdly, to provide a novel means for effecting a quick attachment or detachment of the upper ends of the bars forming the tripod legs with respect to the tripod cap plate.

These objects I accomplish in the manner and by the means hereinafter described and claimed, reference being had to the accompanying drawings, in which:—

Figure 1 is a side elevation of my improved tripod.

Fig. 2 is a top plan view of the same.

Fig. 3 is a fragmentary side elevation of one of the tripod legs, the same being shown partly broken away, and illustrating the locking mechanism for the telescoping sections thereof, said locking mechanism being shown in locked position, and said locking mechanism also constituting the truss member.

Fig. 4 is a view similar to Fig. 3, showing the locking member in one of its unlocked positions.

Fig. 5 is a view similar to Fig. 4, showing the locking member in still another unlocked position.

Fig. 6 is a transverse sectional view taken on the line VI—VI of Fig. 3.

Fig. 7 is a transverse sectional view taken through a portion of the locking mechanism on the line VII—VII of Fig. 3.

Fig. 8 is a detail perspective view of the upper end of one arm of the lower member of one of the tripod legs.

Fig. 9 is a similar view of the same part taken at a different angle.

Fig. 11 is a detail view partly broken away of the point of connection of the upper end of one of the arms of a tripod with the cap plate.

Fig. 12 is a side elevation of the same.

Fig. 13 is a detail view of the lug attached to the cap plate for providing such connection.

Similar numerals of reference denote corresponding parts in the several views.

Figure 10:
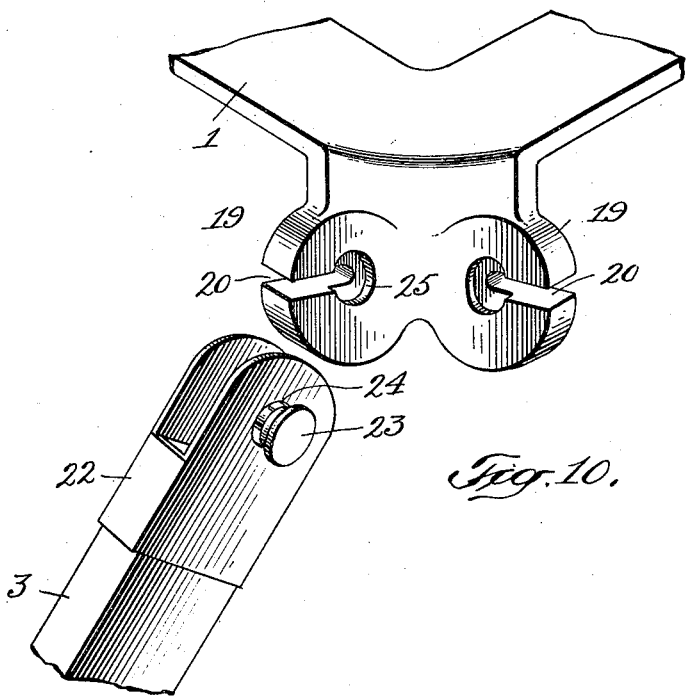
Fig. 10 is a perspective view of a portion of the cap plate showing the upper ends of one of the legs in position to be attached thereto.

In the said drawings, the reference numeral 1 denotes the cap plate of the tripod, which may be formed of aluminum or other suitable material, and to which are detachably attached the upper ends of the tripod legs in a manner hereinafter more specifically described, said points of attachment being pivotal to provide for an adjustment of said legs at any desired angle.

Each of said legs consists of two lower bars 2 and two upper bars 3, the lower ends of the lower bars 2 terminating in a socket 4, provided with a conventional prong 5 adapted to engage the surface supporting the tripod to prevent slipping. The bars 2 and 3 are preferably formed of wood, and are adapted to telescope one upon the other, the two being slidably connected at the lower ends of the upper bars 3 by clips 6 fixed to the lower ends of said upper bars 3, and through which the lower bars 2 are adapted to slide freely. Said lower bars 2 at their upper ends are provided with clips 7 fixed thereto and through which the upper bars 3 pass freely. On their inner sides said clips 7 are slotted vertically at 8, the upper ends of the bars 2 being correspondingly slotted, and the projecting side walls of said clips, which extend above the upper ends of the bars 2, have pivoted therein the laterally extending pintles 9 of an arm 10 on one side and the similar pintles 9 of a slotted link 11 on the other side, said arm and link, in conjunction with a U-shaped connecting plate 12, forming what is in effect a toggle lever adapted to be adjusted to the position shown in Fig. 3. The slot 13 in the link 11 has passing therethrough a pin 14 fixed in the plate 12, thereby providing a sliding connection between said link and plate at one end of said plate. At the other end of said plate the end of the arm 10 is pivoted by means of the pin 15. Fixed to the upper ends of the bars 2 upon their sides adjacent the bars 3, and disposed within the clips 7, are spring plates 16, shown in detail in Figs. 8 and 9, said plates being formed preferably of bronze and having attached to their outer faces, by rivets or otherwise, anti-friction pads 17 formed of leather, felt or other suitable material. The U-shaped connecting plate 12, which embraces the link 11, has its side walls turned horizontally at 18 in parallel relation, the same affording a bearing point for the thumb of the operator in breaking the toggle joint.

The operation of this feature of my invention is as follows:—With the parts in the position shown in Fig. 4, the toggle formed by the arm 10, the link 11 and plate 12 is broken, and as the outer ends of said arm 10 and link 11 are turned upwardly from the horizontal, substantially no pressure is exerted upon the free ends of the spring plates 16, and consequently substantially no binding pressure is exerted upon the bars 2 to retain them against longitudinal movement in the clips 7. But when the elements 10, 11 and 12 are brought to the position shown in Fig. 3, the bars 2 are thereby forced apart, and at the same time the extended ends of the arm 10 and link 11 bear against the free ends of the springs 16 and force the same with their pads 17 vertically against the bars 3, thereby tightly retaining said bars 3 against longitudinal movement, this locking feature having been found in practice to be extremely efficient and capable of resisting any weight that would be imposed upon the tripod. By employing the intermediate U-plate 12 and the slotted link 11, I am enabled to obtain a more complete release of the spring plates 16, which will be seen in Fig. 5, which is the extreme unlocking position of the parts, the pin 14 having been slid to the other end of the slot in link 11, whereby said link and the arm 10 are turned somewhat farther toward the vertical, thereby still further releasing the pressure upon the spring plates 16. It will be observed that while the bars 2 and 3 are bowed outwardly somewhat from a straight line when the locking elements 10, 11 and 12 are in their locked position, which of itself aids in preventing any sliding movement of said bars with respect to each other, and thereby aids in the locking effect, still when the locking elements are brought to unlocking position, the said bars will assume their straight position, whereby they more readily will be capable of telescoping one upon the other, as will be understood.

By referring to Fig. 1, it will be observed that inasmuch as the bars 2 and 3 when disposed in operative relation with respect to the cap plate 1, are in fixed relation with respect to each other at top and bottom, any spreading movement intermediate their length will tend to increase their rigidity and reduce to a minimum any tendency to a torsional deflection. This spreading effect is produced upon said bars by the movement of the locking mechanism hereinbefore described to the locked position shown in Fig. 1, and also in Figs. 3 and 6, the spread of the bars being best illustrated by a comparison of the distance between the same, as shown in Fig. 3 on the one hand, and as shown in Figs. 4 and 5 on the other hand, the latter positions being that assumed by said bars when freed from the spreading effect of the locking mechanism. This feature of the invention is most important as it provides tripod legs which when locked in any adjusted position have produced thereon a truss effect, thereby increasing to the maximum their rigidity, and permitting the use of bars 2 and 3 of comparatively light weight, the effect produced by the locking member being such that the legs have the rigidity of solid pieces of material, which reduces to a minimum any tendency of the cap plate 1 to vibrate, particularly when the tripod is used as a support for a moving picture camera and subjected to vibrating strains under the rotation of the camera shutter.

While I have shown and described this spreading of the bars 2 and 3 to produce the truss effect as accomplished by means of the locking elements 10, 11 and 12, it will be understood that I do not limit myself to this combination of elements, as the locking mechanism may be separate and distinct from the truss mechanism, the truss effect being produced in any desired manner.

In Figs. 10 to 13, I have illustrated my improved means for connecting the upper ends of the bars 3 with the underside of the cap plate 1. It will be seen that said cap plate is formed with a series of lugs 19 rounded on their edges, one for each bar 3, and each of said lugs is slotted horizontally at 20 to permit the insertion therein and removal therefrom of its bolt 21, which is passed through suitable apertures in the projecting upper portion of the metal cap piece 22 at the upper end of each bar 3. Said bolt 21 is headed at its outer end at 23, and is provided next to said head 23 with an annular enlargement 24, smaller than the head 23, but larger than the body of the bolt 21, as best seen in Fig. 11. One side of the lug 19 is recessed at 25 to correspond with the size of the enlargement 24, and is adapted to receive the same when the bolt is pressed in that direction. The other end of said bolt 21 is threaded to receive a thumb-nut, and interposed between said thumb-nut and the cap piece 22 is a split spring washer 27. In operation, the thumb nut 26 is unscrewed sufficiently to permit the bolt 21 to shift to the left, in Fig. 11, so as to disengage the enlargement 24 from its recess 25, whereupon the bolt 21 may be disengaged from the lug 19 through the slot 20, and the bar 3 thereby detached from the cap plate 1. To assemble the parts, the bolt 21 is inserted through the slot 20 to position in the lug 19, and said bolt then pressed to the right to engage the enlargement 24 in the recess 25, whereupon by tightening the nut 26 the parts will be very firmly retained in position, and yet be free to permit a pivotal movement of the leg with respect to the cap plate 1.

Figure 14:
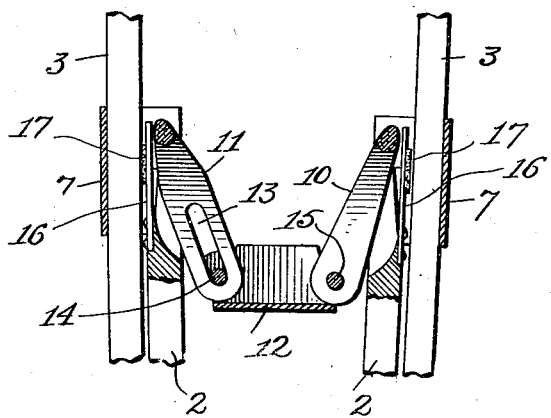
Fig. 14 is a view similar to Fig. 5 disclosing a slightly modified construction of the locking member.

I have illustrated in Fig. 14 a slightly modified construction of the means for locking the telescoping sections of the tripod in any adjusting position, the difference between said construction and that shown in Figs. 3, 4 and 5 being that in the modification the slotted link 11 is shown of a length equal to the arm 10, whereby when the parts are brought to the complete unlocking position, the U-plate 12 will assume a horizontal position, which will present a somewhat more symmetrical appearance than that presented by the unlocked position illustrated in Fig. 5.

It will be understood that while my improved tripod is especially adapted for use in connection with motion picture cameras and projectors, still I do not wish to be understood as limiting myself to these particular uses, as it is equally well adapted for use in connection with any and all apparatus with which tripods have been employed heretofore. And for this reason while I have shown a particular form of cap plate 1, it will be understood that the shape and form of said cap plate may be varied in any desired manner to suit any particular use.

Having thus described my invention, what I claim as new and desire to secure by Letters Patent, is:—

1. In a tripod, a leg comprising a pair of upper and a pair of lower bars, said bars when in position being held in fixed relation to each other at the top and bottom of said leg, clips engaging said upper and lower bars telescopically with each other, spring tongues on one side of said bars adapted to contact with the other bars telescoping therewith, and means for forcing said spring tongues against said bars with which they contact to lock said sets of bars in fixed relation.

2. In a tripod, a leg comprising a pair of upper and a pair of lower bars, said bars when in position being held in fixed relation to each other at the top and bottom of said leg, clips engaging said upper and lower bars telescopically with each other, spring tongues on one side of one pair of bars, anti-friction pads fixed to the outer sides of said spring tongues and adapted to contact with the other bars, and means contacting with said spring tongues for forcing said pads against said bars with which they contact to lock said sets of bars in fixed relation.

3. In a tripod, a leg comprising a pair of upper and a pair of lower bars, said bars when in position being held in fixed relation to each other at the top and bottom of said leg, clips engaging said upper and lower bars telescopically with each other, spring tongues on one side of one pair of said bars adapted to contact with the other bars telescoping therewith, and a toggle joint for forcing said spring tongues against said bars with which they contact to lock said sets of bars in fixed relation.

4. In a tripod, a leg comprising a pair of upper and a pair of lower flexible bars, said bars when in position being held in fixed relation to each other at the top and bottom of said leg, clips engaging said upper and lower bars telescopically with each other, spring arms at the upper ends of said lower bars adapted to be forced into contact with their coöperating upper bars, and a toggle joint adapted when expanded to force said springs into frictional engagement with said upper bars, and simultaneously to bow said bars, thereby locking said upper and lower bars in fixed relation.

5. In a tripod, a leg comprising a pair of upper and a pair of lower bars, said bars when in position being held in fixed relation to each other at the top and bottom of said leg, clips fixed to the lower ends of said upper bars and to the upper ends of said lower bars and through which the other bars pass telescopically, spring plates at the upper ends of said lower bars within said upper clips and adjacent the faces of said upper bars, and a toggle pivoted in said upper clips and adapted when expanded to force said spring plates against said upper bars to lock said upper and lower bars in fixed relation.

6. In a tripod, a leg comprising a pair of upper and a pair of lower flexible bars, said bars when in position being held in fixed relation to each other at the top and bottom of said leg, clips fixed to the lower ends of said upper bars and to the upper ends of said lower bars and through which the other bars pass telescopically, spring plates at the upper ends of said lower bars within said upper clips and adjacent the faces of said upper bars, and a toggle pivoted in said upper clips and adapted when expanded to force said spring plates against said upper bars to lock said upper and lower bars in fixed relation, and also to bow said bars outwardly to form a truss member.

7. In a tripod, a cap plate, slotted lugs attached thereto, supporting legs adapted to embrace said lugs and apertured to register with the inner ends of the slots therein, and bolts passing through the apertures in said legs and adapted to be passed through the slots in said lugs, said bolts acting to lock said legs to said lugs.

8. In a tripod, a cap plate, slotted leg receiving lugs attached thereto, said slots at their inner ends being recessed on one side, supporting legs, bolts passing through the upper ends of said legs, and adapted to be passed through the slots in said lugs, and enlargements on the headed ends of said bolts adapted through a longitudinal shift of said bolts to engage the recesses at the inner ends of said slots to lock said bolts against withdrawal through said slots.

In testimony whereof I hereunto set my hand this 20th day of April, 1916.

CARL E. AKELEY.

Copies of this patent may be obtained for five cents each, by addressing the "Commissioner of Patents, Washington, D. C."